(12) United States Patent
Caspi (10) Patent No.: US 6,909,794 B2
(45) Date of Patent: Jun. 21, 2005

(54) AUTOMATED REGISTRATION OF 3-D MEDICAL SCANS OF SIMILAR ANATOMICAL STRUCTURES

(75) Inventor: Anat Caspi, San Francisco, CA (US)

(73) Assignee: R2 Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/993,790

(22) Filed: Nov. 23, 2001

(65) Prior Publication Data

US 2002/0141626 A1 Oct. 3, 2002

Related U.S. Application Data (60) Provisional application No. 60/252,743, filed on Nov. 22, 2000, and provisional application No. 60/314,582, filed on Aug. 24, 2001.

(51) Int. Cl.[7] .................................................. G06K 9/00
(52) U.S. Cl. ....................................................... 382/128
(58) Field of Search ................................. 382/128, 131, 382/195, 196, 206, 278, 284, 285, 294, 295, 296; 378/4, 21, 23, 25

(56) References Cited

U.S. PATENT DOCUMENTS

| | | | | |
|---|---|---|---|---|
| 5,568,384 A | * | 10/1996 | Robb et al. | 715/532 |
| 5,611,000 A | * | 3/1997 | Szeliski et al. | 382/294 |
| 5,633,951 A | * | 5/1997 | Moshfeghi | 382/154 |
| 5,956,418 A | * | 9/1999 | Aiger et al. | 382/154 |
| 5,970,182 A | * | 10/1999 | Goris | 382/278 |
| 6,154,518 A | * | 11/2000 | Gupta | 378/62 |
| 6,512,518 B2 | * | 1/2003 | Dimsdale | 345/427 |

* cited by examiner

*Primary Examiner*—Andrew W. Johns
*Assistant Examiner*—Shervin Nakhjavan
(74) *Attorney, Agent, or Firm*—R2 Technology, Inc.

(57) ABSTRACT

The invention provides a hierarchical method that is based on multi-scale computation and motion-tracking algorithms to register images. A hierarchical registration algorithm is used to address extrinsic and intrinsic variations. In particular, a global similarity transformation is applied to align anatomical structures in a global manner. Next, a local similarity transformation is applied to fine-tune and adjust internal details. The registration output provides the input necessary for other automated computations, such as volume and size comparisons and measurements.

28 Claims, 8 Drawing Sheets

AUTOMATED REGISTRATION OF 3-D MEDICAL SCANS OF SIMILAR ANATOMICAL STRUCTURES

CROSS-REFERENCE TO RELATED APPLICATIONS

Related applications are:

"Density Nodule Detection in 3-Dimensional Medical Images," Ser. No. 09/993,792, filed Nov. 23, 2001;

"Method and System for the Display of Regions of Interest in Medical Images," Ser. No. 09/990,508, filed Nov. 21, 2001;

"Vessel Segmentation with Nodule Detection," Ser. No. 09/993,791, filed Nov. 23, 2001;

"Lung Field Segmentation from CT Thoracic Images," Ser. No. 09/993,793, filed Nov. 23, 2001;

"Pleural Nodule Detection from CT Thoracic Images," Ser. No. 09/993,789, filed Nov. 23, 2001; and "Graphical User Interface for Display of Anatomical Information," Ser. No. 09/990,511, filed Nov. 21, 2001, claiming priority from Ser. No. 60/252,743, filed Nov. 22, 2000 and from Ser. No. 60/314,582 filed Aug. 24, 2001.

This application hereby incorporates by reference the entire disclosure, drawings and claims of each of the above-referenced applications as though fully set forth herein.

FIELD OF THE INVENTION

This invention relates to image registration in medical diagnostic systems and methods for constructing three-dimensional representations from two or three-dimensional image data sets. The invention includes methods and systems for image registration and correlation of a three-dimensional data image volume to another three-dimensional data image volume.

BACKGROUND OF THE INVENTION

The diagnostically superior information available from data acquired from various imaging systems, especially that provided by multidetector CT (multiple slices acquired per single rotation of the gantry) where acquisition speed and volumetric resolution provide exquisite diagnostic value, enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital acquisition systems for creating digital images include digital X-ray radiography, computed tomography ("CT") imaging, magnetic resonance imaging ("MRI") and nuclear medicine imaging techniques, such as positron emission tomography ("PET") and single photon emission computed tomography ("SPECT"). Digital images can also be created from analog images by, for example, scanning analog images, such as typical x-rays films, into a digitized form. Further information concerning digital acquisition systems is found in our above-referenced copending application "Graphical User Interface for Display of Anatomical Information".

Digital images are created from an array of numerical values representing a property (such as a grey scale value or magnetic field strength) associable with an anatomical location referenced by a particular array location. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels.

Once in a digital or digitized format, various analytical approaches can be applied to process digital anatomical images and to detect, identify, display and highlight regions of interest (ROI). For example, digitized images can be processed through various techniques, such as segmentation. Segmentation generally involves separating irrelevant objects (for example, the background from the foreground) or extracting anatomical surfaces, structures, or regions of interest from images for the purposes of anatomical identification, diagnosis, evaluation, and volumetric measurements. Segmentation often involves classifying and processing, on a per-pixel basis, pixels of image data on the basis of one or more characteristics associable with a pixel value. For example, a pixel or voxel may be examined to determine whether it is a local maxima or minima based on the intensities of adjacent pixels or voxels.

Once anatomical regions and structures are constructed and evaluated by analyzing pixels and/or voxels, subsequent processing and analysis exploiting regional characteristics and features can be applied to relevant areas, thus improving both accuracy and efficiency of the imaging system. For example, the segmentation of an image into distinct anatomical regions and structures provides perspectives on the spatial relationships between such regions. Segmentation also serves as an essential first stage of other tasks such as visualization and registration for temporal and cross-patient comparisons.

Image registration is a process of alignment of medical imaging data for facilitating comparisons and medical diagnosis. Image registrations of digital images allow doctors to visualize and monitor physiological changes in a patient over time or to keep track of the growth or decline of lesions. For example, image registration enables doctors to identify, compare and determine the growth of a malignant lesion or nodule. A comprehensive survey of existing medical image registration is given in "Medical Imaging Matching—A Review With Classification", van den Elsen, Pol, and Viergever, IEEE Engineering in Medicine and Biology, Vol. 12, No. 1, pp. 26–39, 1993. This reference is hereby incorporated for all purposes.

Anatomical registration is a difficult problem because anatomical structures vary widely in appearance and location within different patients. Even within the same patient, the passage of time often brings about great variations. Variations with respect to the patient and patient anatomy are generally referred to as intrinsic variations. Intrinsic, or local, variations refer to structural differences between anatomical structures. For example, intrinsic variations result when image acquisition is performed out of phase (i.e., taking the image during a different breath-phase or heart-beat), but are also unavoidable due to differences between patients and changes in patients over time.

The task of mapping an image of a particular anatomical structure to another image is difficult also due to variations between images. For example, variations can occur due to differences in image acquisition environments, differences between patients (for a cross-patient comparison), and/or corporeal changes over time (for a temporal comparison). Variations due to factors external to a patient anatomy are generally referred to as extrinsic variations. Certain extrinsic, or global, variations result from the lack of standard protocols or orientations for image acquisitions. For example, even if attempts are made to take images along a principal axis, the actual axis along which cross-section images are obtained may be at an angle to the principal axis. Additionally, the use of different fields-of-view, dose, and varying patient size all contribute to extrinsic variations.

Most existing medical image registration methods require user interaction and/or are computationally expensive or intensive. One method commonly used for medical image registration is based on the mutual information approach. The mutual information approach is based upon the maximization of mutual information criteria used to select attributes conditioned on prior registrations. Having its origin in information theory, mutual information criteria generally include a numerical value that indicates how well each attribute discriminates a chosen label attribute, i.e., the relatedness of one random variable to another is based upon a measure of the variables' entropies. One example can include two-dimensional gray-scale histograms of image pairs that are used for registration. One drawback of the mutual information approach is that it generally does not account for different types of variations (i.e., extrinsic and intrinsic variations) between images. Another drawback of the mutual information approach is that entire data sets of the image pairs need to be analyzed. Thus, it is very time consuming and inefficient.

Correlation-based approaches involving cross-correlation or cross-covariance of image pixel intensities provide methods of image registration. However, such approaches are generally not accurate for image content and noise that exhibit large variations and differences.

Another existing method, the atlas model approach, requires the use of a pre-determined "atlas model" that characterizes an anatomical structure being registered. In this approach, generic anatomical structures are used as a pattern for the structure being registered. However, since medical scan procedures do not always scan an anatomical structure in its entirety, or in a particular orientation, and since the population being scanned for pathologies is likely to exhibit abnormalities or variations in his/her anatomical structures, the atlas model approach often results in mismatched registrations. Moreover, the atlas model is not effective in tracking lesions that completely appear or disappear from one image set to another.

Thus, it is desirable to provide systems and methods for registering images based on selective sampling that are insensitive to partial scans. It is yet further desirable to provide systems and methods for registering images that support temporal and cross-patient comparisons. Moreover, it is desirable to provide systems and methods for registering images that can reduce computation time through sampling or without always having to analyze an entire data set. On the other hand, it is desirable to provide systems and methods of registration that improve accuracy and resolution by using relevant information from image sets to compute the image registration or fusion. It is further desirable to provide systems and methods for registering images that provide input data for other computations such as volume and size measurements. It is also desirable that the systems and methods provided for registering images support various data acquisition systems, such as CT, PET or SPECT scanning and imaging.

It is an object of the present invention to address and incorporate the above considerations. A further object of the present invention is to provide systems and methods for registering images based on selective sampling that are insensitive to patient anatomical abnormalities or variations. A further object of the present invention is to bring corresponding structures into alignment or otherwise align one image or sequence with a corresponding image or sequence. Additionally, it is also desirable to provide a system and method that can detect and track vanishing and appearing objects, such as lesions, within the context of the larger surrounding anatomy. The present invention provides a system and method that is accurate and displays high levels of physiological detail over the prior art without specially configured equipment.

SUMMARY OF THE INVENTION

This invention employs a hierarchical method that is based on multi-scale computation and motion-tracking algorithms. In particular, a global similarity transformation is applied to align anatomical structures in a global manner. A local similarity transformation is then applied to fine-tune and adjust internal details.

Once patient scans have been obtained, the invention is capable of registering a first scan to a second scan in 2-D or 3-D. The systems and methods disclosed herein for mapping or autofusing one image to another image compensate for both extrinsic and intrinsic variations. In one aspect, a hierarchical registration algorithm is used to address the two types of variations separately. The output of the registration provides the input necessary for other automated computations, such as volume and size and measurements.

DETAILED DESCRIPTION OF THE INVENTION

The present invention is a system and method for the mapping and image registration of 3-D image data volumes or 2-D image data planes. Image volumes can be displayed on a graphical user interface ("GUI") to provide comparison information for medical diagnosis and physiological evaluation. The system and method can display various planar views and allows for highlighting ROIs and receiving user input regarding specific image data to be presented and selected.

According to one system and method of the present invention, image registration inputs and outputs displayed on a GUI preferably include two 3-D image data volumes where one of the 3-D image data volumes is held fixed while voxels from the image data of a second set may be scaled, rotated, and translated to map anatomic features. Additionally, the GUI preferably allows for the selection and update of various planar and volumetric images by inputting commands (for example, by dragging/clicking a cursor in a particular display window) with no delay apparent to the user. Additionally, data volumes may rotated, updated or selected with respect to fixed data.

Image registration is characterized as the aligning and combining of multiple images of a region of interest in 2-D and/or 3-D. Image registration and comparison permits the derivation and extraction of diagnostic and physiological information about an ROI that would be unavailable from any one of an digital images simply in 2-D or 3-D without further processing.

The digital image sections to be processed, rendered, displayed or otherwise used includes digitized images acquired through any plane, including, without limitation, sagittal, coronal and axial (or horizontal, transverse) planes and including planes at various angles to the sagittal, coronal or axial planes. While the disclosure may refer to a particular plane or section, such as an axial section or plane, it is to be understood that any reference to a particular plane is not necessarily intended to be limited to that particular plane, as the invention can apply to any plane an orientation acquired by any digital acquisition system.

Figure 1:
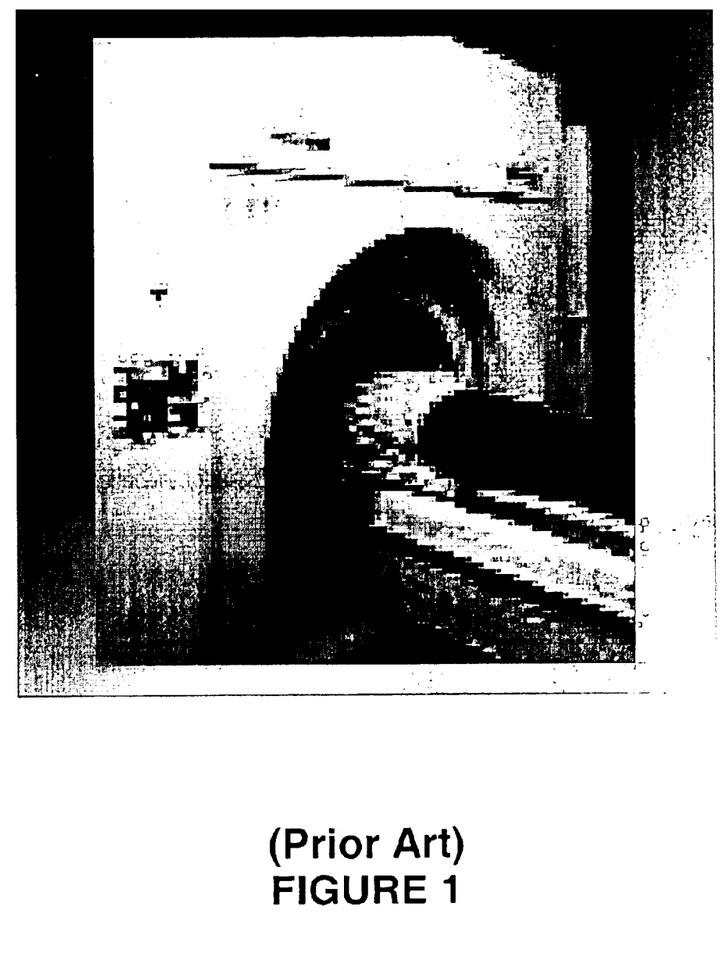
FIG. 1 illustrates an exemplary position of a patient in a CT scanner in accordance with prior art.
Figure 2:
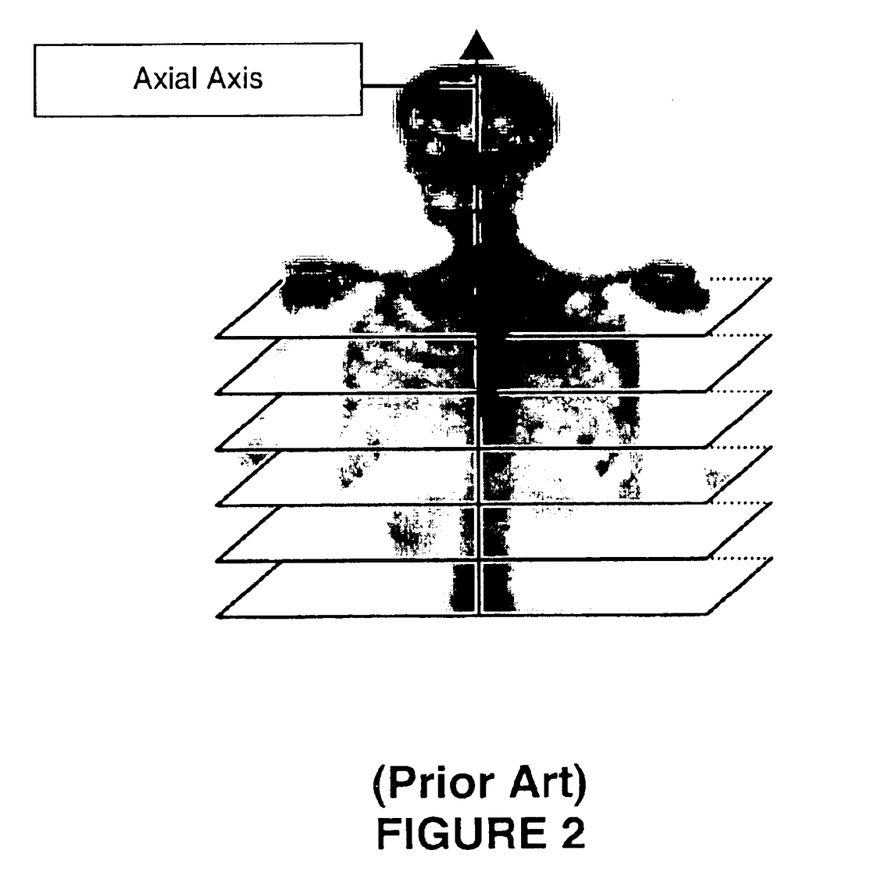
FIG. 2 illustrates an exemplary CT volume of a patient obtained via a CT scanner in accordance with prior art.
Figure 3:
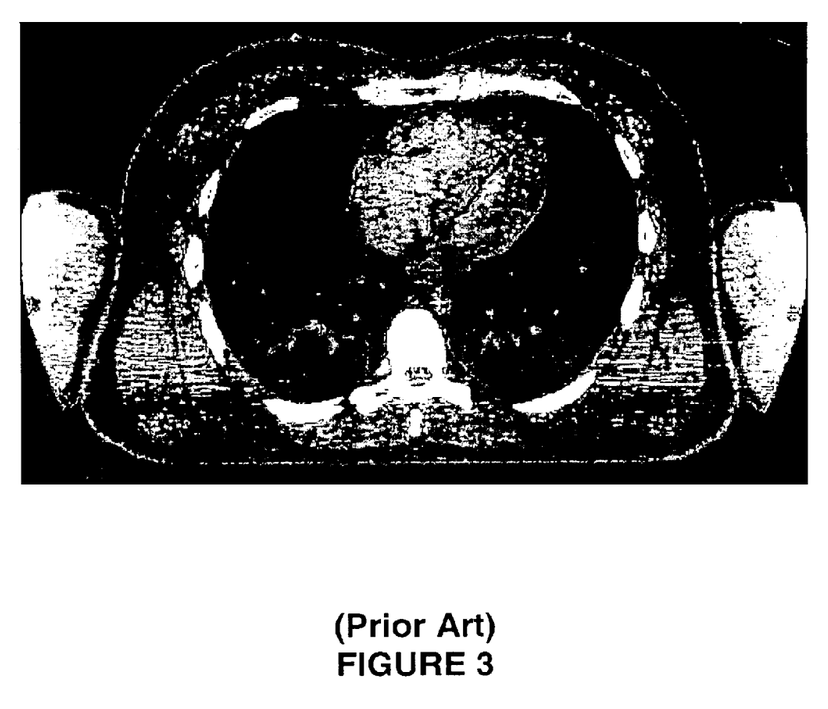
FIG. 3 illustrates an exemplary axial slice taken with a CT scanner.

FIG. 1 illustrates a position of a patient in a digital acquisition system, such as computer tomography (CT) scanner. FIG. 2 illustrates an exemplary CT volume of the patient obtained via the CT scanner. A CT volume is a series of parallel cross-section images taken along a planar axis. FIG. 3 illustrates an exemplary axial slice in the lungs taken with a CT scanner. For example, a typical CT axial image is 512×512 array of 12-bit gray scale pixel values. Such an image has a spatial resolution of approximately 500 microns. Other digital acquisition techniques also yield images that may be stacked to create digitized volumetric data that may be used in accordance with the invention disclosed herein.

The present invention is preferably performed on a computer system such as a Pentium™-class personal computer running computer software that implements the algorithm of the present invention. The computer includes a processor, a memory and various input/output means. One or more digital images are accessible by the computer using conventional storage and input means.

The algorithm disclosed herein automates the process of registering anatomical structures in digital images of the same or similar physiological structures. The methods disclosed herein may be used for registering scans of the same patient over time or for cross-patient registration. The algorithm is capable of detecting and tracking vanishing and appearing objects, such as lesions, within the context of the larger surrounding anatomy.

A hierarchical algorithm is used to address global and local variations separately. A first part global similarity transformation is applied to align anatomical structures together in a gross manner. A second part local similarity transformation is applied to fine-tune and adjust internal details. The hierarchical approach takes into account both extrinsic and intrinsic variations. The invention is automated and does not require manual input. The assumptions made are appropriate for the medical imaging domain.

Automated alignment and registration performed by the algorithm disclosed herein achieves accurate and high-speed updates of the data image volumes. According to one aspect of the present invention, registration images can be displayed while at the same time displaying other views and/or data used for creating the registered image on a computer display. For example, the display could show one or more digital image slices used to create a registered image along with the registered image itself. Further teachings relating to displaying various 2-D and 3-D images over a GUI, means for receiving and responding to user inputs, marking and identifying ROIs, updating digital images for display, displaying temporal and cross-patient information and acquiring, accessing and providing detailed physiological measurement information is disclosed in our co-pending application "Graphical User Interface for Display of Anatomical Information", Ser. No. 60/252,743, filed Nov. 22, 2000 which has incorporated herein by reference. The image registration disclosed herein equally applies to any display or system for displaying 2-D and 3-D registration images.

The image registration disclosed herein supports matching of image objects using a GUI and an automated method to compute the alignment and registration of the separate images without user interaction. These combined actions and optimization techniques and approaches according to the present invention are complementary and the alignment and registration that results is more accurate and computationally effective than prior methods. As will be further described and detailed herein, the system and method accomplish the image registration by the following general approach. First, two sets of image data scans are obtained. Next, global and local similarity transformations are performed on the scans. Scaling, rotation and translation transformations are performed to account for global variations. Local similarity transformation processes are performed to compensate for intrinsic differences. Highly identifiable points or features points are identified for use as transformation reference markers. Transformation weighting is typically performed for pixels not related to feature points.

More details on nodule detection in 3-D images can be found in the above-referenced applications "Pleural Nodule Detection from CT Thoracic Images," Ser. No. 09/993,789, filed Nov. 23, 2001 and "Density Nodule Detection in 3-Dimensional Medical Images," Ser. No. 09/993,792, filed Nov. 23, 2001.

Figure 4:
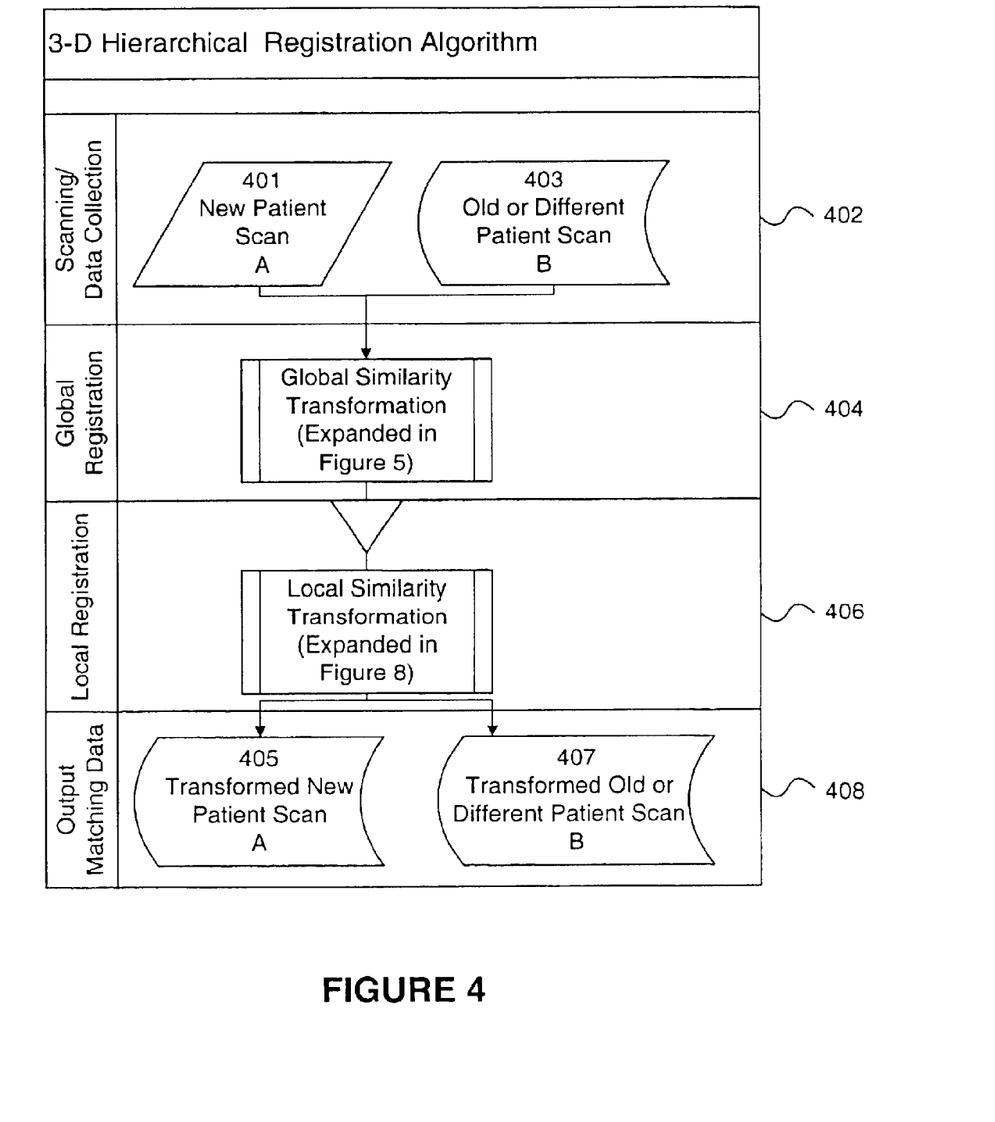
FIG. 4 illustrates an exemplary hierarchical registration algorithm in accordance with an embodiment of the invention.

FIG. 4 illustrates an exemplary hierarchical registration algorithm and overview flowchart in accordance with an embodiment of the invention. New patient scan 401 and an old patient scan or a different patient scan 403 are collected at step 402. Next, a global similarity transformation process is performed on scans 401 and 403 (step 404). One global similarity transformation process approach is described below in relation to FIG. 5. Next, a local similarity transformation process is performed on scans 401 and 403 at step 406. An exemplary local similarity transformation approach is described in relation to FIG. 8 below. Finally, a transformed new patient scan (scan A) 405 and a different patient scan (scan B) 407 are provided as the output (step 408).

Global variations are addressed by a global similarity transformation. In one embodiment, the global similarity transformation is a so-called six-degree transformation that employs scaling, rotation, and a translation process to account for the global variations in 3-D. The transformation can also accommodate and employ 2-D scaling and rotations.

Figure 5:
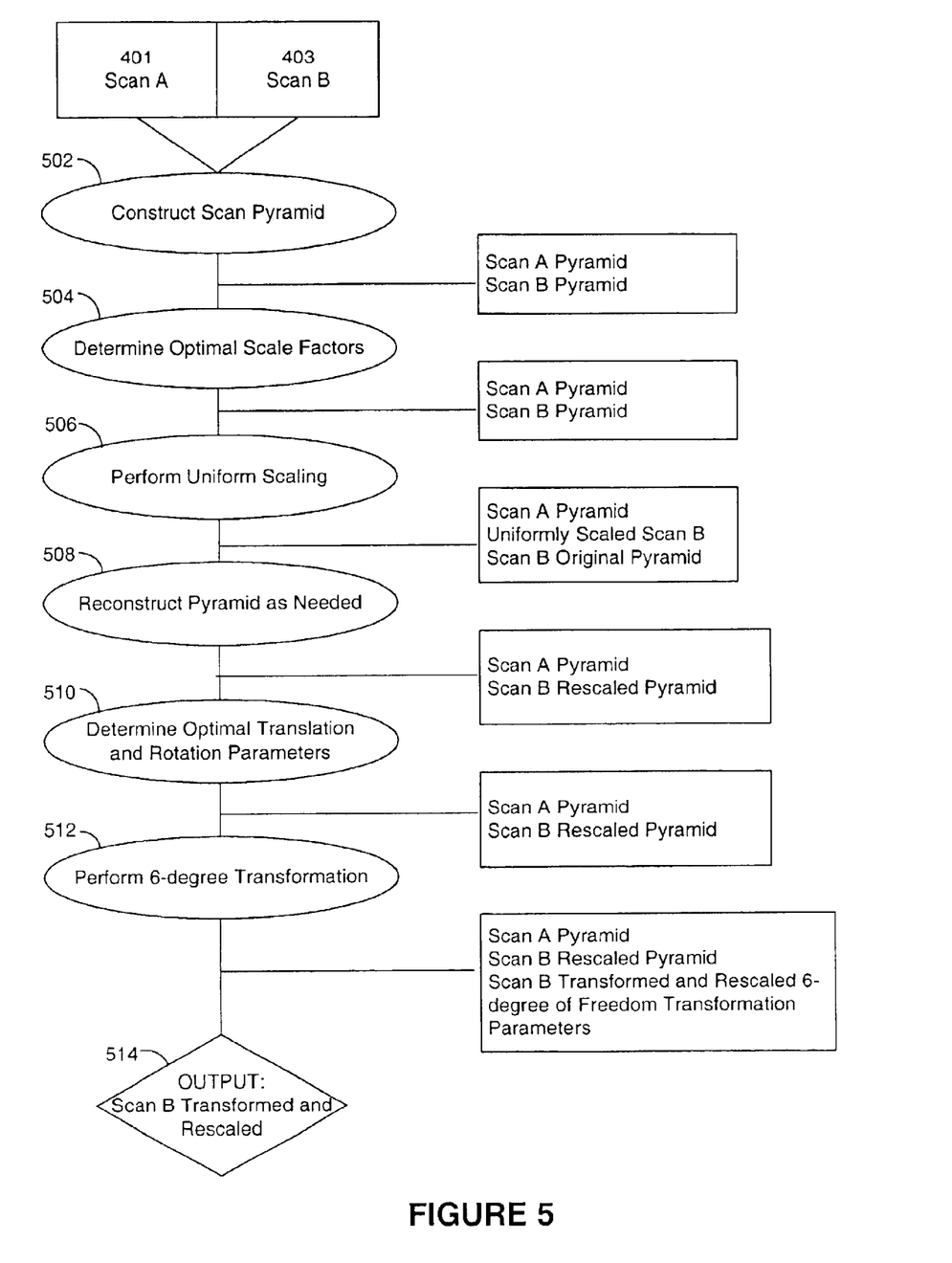
FIG. 5 illustrates an exemplary global similarity transformation process in accordance with an embodiment of the invention.

FIG. 5 illustrates a global similarity transformation process in accordance with an embodiment of the invention.

Scan pyramids are constructed for scans 401 and 403 at step 502. A scan pyramid, or simply pyramid, is a sequence of copies of an image in which both sample density and resolution are decreased in successive levels. That is, adjacent levels of the pyramid proceed in increasing coarseness and indicate a level of subsampling performed. For example, the finest scale is the original image and the coarsest scale is the topmost level of the pyramid. As an illustration, the pyramids for the scan 401 and the scan 403 could have three levels. To obtain a next level of a pyramid from a previous level, a filtering operator may be applied (e.g., a 3-D Gaussian or Gaussian-like kernel) followed by a sampling operator that typically samples every other pixel or voxel. Depending on desired efficiency and resolution, computations for the global similarity transformation can be done on sampled or sub-sampled scans.

Using the constructed scan 401 pyramid and scan 403 pyramid, a set of optimal scale factors is determined (step 504). These scale factors refer to a level of magnification or demagnification relative to an image size to equalize, for example, zoom levels during image acquisition. Processes to determine a set of optimal scale factors will be described below. Once a set of optimal scale factors is determined, a uniform scaling is performed on scan 403 using the set of optimal scale factors to obtain a rescaled scan B (step 506). The scan 403 pyramid is reconstructed after the uniform scaling (step 508). Next, a set of optimal translation and rotation parameters is determined (step 510). One process for determining a set of optimal translation and rotation parameters is described in FIG. 6.

In one embodiment, a six-degree transformation is performed on rescaled scan 403 based on the set of optimal translation and rotation parameters to obtain a transformed and rescaled scan B (step 512). Various six-degree transformation processes are known in the art and can be used for the systems and methods disclosed herein. The output of the various transformation processes is the transformed and rescaled scan B (step 514).

In an exemplary embodiment, each scan 401 or scan 403 is a 3-dimensional image volume. The z-axis as used herein is defined as the axis perpendicular to scan slices (i.e., the z-axis is aligned along the route of the scanner). X- and y-axes are defined in a right-handed system anchored about the defined z-axis. All the voxels in the first volume (scan A) be defined as the set $I_A$, such that $I_A(x, y, z)$ specifies the intensity value of a particular voxel in the first volume with coordinates [x, y, z] with respect to an origin defined at one corner of the volume. For example, in CT thoracic scans, the origin is defined at the right, anterior, and superior corner of the body. All the voxels in the second volume (scan B) be defined as the set $I_B$ in the same manner. New coordinates of a voxel after a transformation T operating on [x, y, z] in the first volume (scan A) are represented as $T_A[x, y, z]$.

In a representative embodiment, a voxel is 500µ×500µ× (1000µ to 3000µ). A ROI is approximately 3000µ to 20,000µ in diameter and comprises up to 40×40 voxels in the x- and y-directions and up to 20 voxels in the z-direction.

In an exemplary embodiment, the scale factors are determined in the x, y, and z directions through division once the voxel size is known in both scans 401 and 403. For example, if the voxel size of scan 401 is (xa,ya,za) and the voxel size of scan B is (xb,yb,zb), then the scaling parameters are (xa/xb, ya/yb, za/zb). The scaling matrix (where all coordinates of the scans A 401 and B 403 have been homogenized and the origin translated to the center of the volume) is as follows:

$$\begin{bmatrix} \frac{xa}{xb} & 0 & 0 & 0 \\ 0 & \frac{ya}{yb} & 0 & 0 \\ 0 & 0 & \frac{za}{zb} & 0 \\ 0 & 0 & 0 & 1 \end{bmatrix}$$

In some systems, the voxel size information is known. If the voxel size in both scans 401 and 403 is unknown, some segmentation of the scanned anatomical structure is performed. Segmentation techniques can include processes for separating irrelevant objects (for example, the background and foreground) or for segmenting (i.e., extracting) anatomical surfaces from images for the purposes of anatomical identification, diagnosis, evaluation, and volumetric measurements. The segmentation of image volume into distinctive anatomical regions and structures provides perspectives on the spatial relationships between such regions. Once anatomical regions and structures are segmented out, subsequent processing and analysis exploiting regional characteristics can be applied to relevant areas. From the segmentation, the anatomical structure's largest span in the x-, y-, and z-directions can be determined by various known methods. When the largest spans in the x-, y-, and z-directions are obtained for both scan A 401 (whose span in the x-, y-, and z-directions is identified as Xa, Ya, Za, respectively) and scan B 403 (whose span in the x-, y-, z-directions is identified as Xb, Yb, and Zb, respectively), the scaling matrix (where all coordinates of the scans A 401 and B 403 have been homogenized and the origin is translated to the center of the volume) is as follows:

$$\begin{bmatrix} Xa/Xb & 0 & 0 & 0 \\ 0 & Ya/Yb & 0 & 0 \\ 0 & 0 & Za/Zb & 0 \\ 0 & 0 & 0 & 1 \end{bmatrix}$$

Typically, the scaling matrix is built on the assumption that there is a generally similar orientation of the anatomical structures in both scans. If such an assumption does not hold, the scaling steps 504–506 are skipped. Instead, an orientation effect is considered in the rotation/translation matrix, described below. In other words, scaling can be performed separately or as part of a rotation/translation step.

Figure 6:
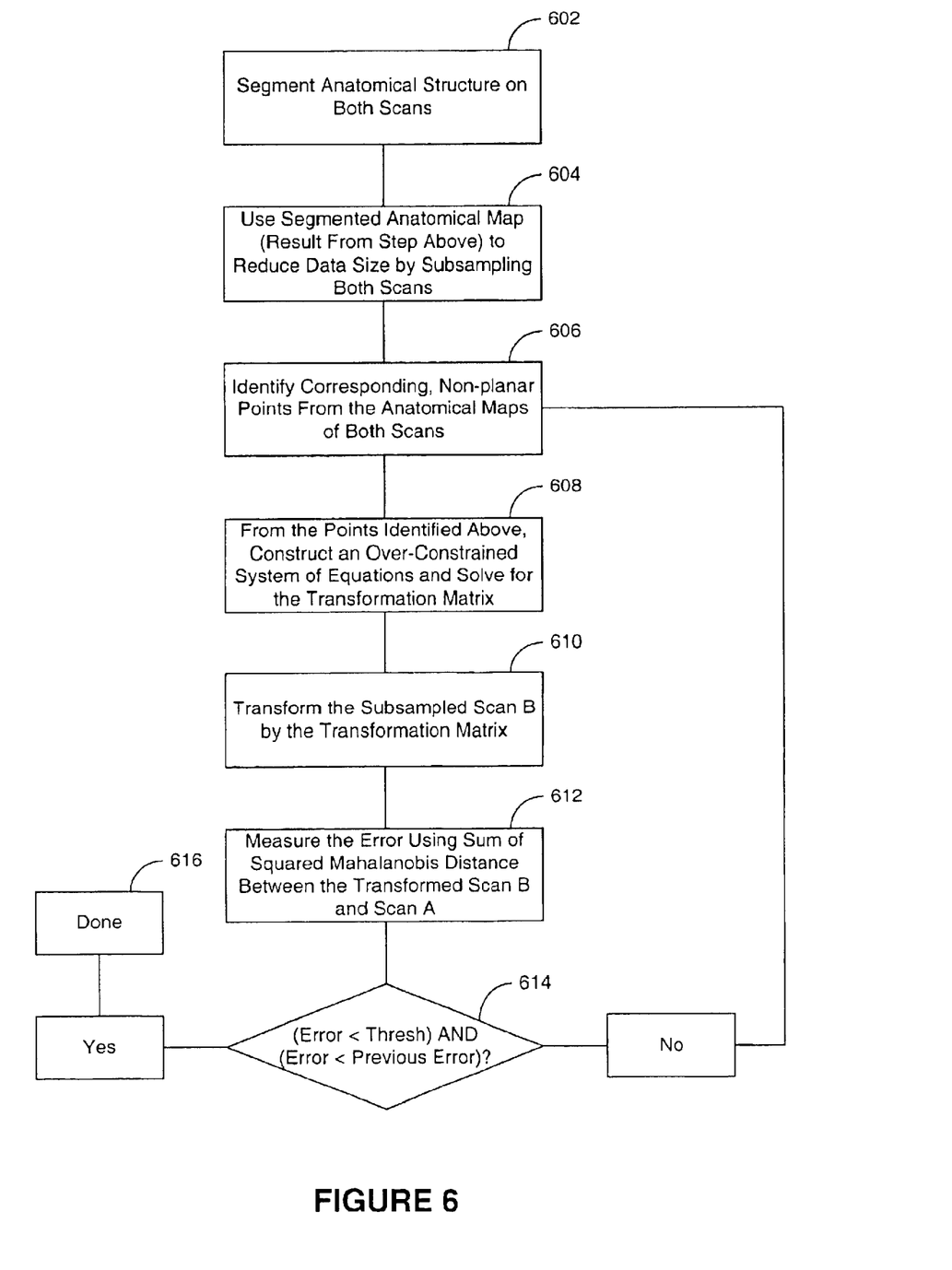
FIG. 6 illustrates an exemplary process for determining optimal transformation and rotation parameters in accordance with an embodiment of the invention.

FIG. 6 illustrates one process for determining optimal translation and rotation parameters in accordance with an embodiment of the invention. Generally, optimal translation and rotation parameters are determined based on a selected number of roughly matching points in the scan 401 and the scan 403. The selection of roughly matching points depends on the type of scan and the structure being scanned. Typically, specific identifiable points on the boundary or identifiable contours are selected as matching points. Identifiable points are locations in a structure (e.g., tracheal bifurcations or specific bone formations) that are present in other similar/same anatomical structures and appear singularly in scans that are being analyzed. Identifiable contours are curves that can be parameterized and are capable of binding the anatomical structure in a singular descriptive way. Generally, a rough estimation of the boundaries of an anatomical structure is performed for the selection of rough matching points. At step 602, an anatomical structure in both scan 401 and scan 403 is segmented to obtain segmented anatomical maps. In an exemplary embodiment, the segmentation is performed to the extent necessary for selecting roughly matching points. For example, an anatomical segmentation is described in the "Lung Field Segmentation from CT Thoracic Images," Ser. No. 09/993,793, filed Nov. 23, 2001, and incorporated by reference.

Next, the segmented anatomical maps are used to reduce data size by subsampling both scans 401 and 403 (step 604). In an exemplary embodiment, corresponding, non planar points from the segmented anatomical maps of both scans 401 and 403 are then identified (step 606). In an exemplary embodiment, for a given scan, at least four non-coplanar identifiable points, one contour that is non-coplanar with an identifiable point, or a minimum of two non-coplanar contours with no identifiable point are selected. In one embodiment, for every selected contour, three non-colinear points can be generated and used as identifiable points, as long as the non-colinear points were generated in the same manner as the parameterization of the contours in both scans. Thus, the scan 401 has a set, q, comprising four or more identifiable points that corresponds to a set, p, comprising four or more identifiable points in the scan 403.

Next, based on the identified points for each scan 401 or 403, an over-constrained system of equations is constructed and solved for the transformation matrix (step 608). For example, if P and Q are matrices containing the homogenized coordinates of the points in p and q, respectively, for n points contained in p and q, P and Q would each be an n-by-four matrix, where the first column contains all the x-coordinates of the points, the second column contains the y-coordinates, the third column contains the z-coordinates, and the fourth column contains the homogenized coordinate. If the set
p={(p1x, p1y, p1z), (p2x, p2y, p2z), . . . (pnx, pny, pnz)}, the corresponding P matrix would be constructed as follows:

$$P = \begin{bmatrix} p1x & p1y & p1z & 1 \\ p2x & p2y & p2z & 1 \\ \ldots & \ldots & \ldots & \ldots \\ pnx & pny & pnz & 1 \end{bmatrix}$$

Assuming that the points in P and Q are corresponding points in the two scans (which they ought to be by construction), the transformation matrix can be found by an over-constrained system of equations described by:

$$P = M \cdot Q$$

where the raised dot expresses matrix multiplication and M is a four-by-four transformation matrix.

An over-constrained system of equations does not always have a singular solution. In such a case, the solution that comes closest to satisfying the system is selected. A solution is closest when it minimizes the sum of squares of the difference between the right- and left-hand sides of $P=M \cdot Q$.

In an exemplary embodiment, a singular value decomposition of the Q matrix is used to solve the least squares problem as discussed in "Computer Methods for Mathematical Computations," Forsythe, G. E., Malcolm, M. A., and Moler, C. B. 1977, (Englewood Cliffs, N.J. Prentice-Hall), Chapter 9 and in "Matrix Computations," Golub, G. H., and Van Loan, C. F. 1989, $2^{nd}$ Edition (Baltimore: Johns Hopkins University Press), §8.3 chapter 12, §5.2.6. The singular value decomposition (SVD) decomposes Q into three matrices:

$$[Q_{(n \times 4)}] = [U_{(n \times 4)}] \cdot \begin{bmatrix} w_1 & 0 & 0 & 0 \\ 0 & w_2 & 0 & 0 \\ 0 & 0 & w_3 & 0 \\ 0 & 0 & 0 & w_4 \end{bmatrix}_{w(4 \times 4)} \cdot [V^T_{(n \times n)}]$$

where U is an n-by-four column-orthogonal matrix, w is a four-by-four diagonal matrix with Q's singular values in its diagonal (positive or zero), and $V^T$ is the transpose of V, which is a four-by-four orthogonal matrix. From this decomposition, the inverse matrix, $Q^{-1}$, of Q can be computed as follows:

$$[Q^{-1}_{(4 \times n)}] = [V_{(n \times n)}] \cdot \begin{bmatrix} 1/w_1 & 0 & 0 & 0 \\ 0 & 1/w_2 & 0 & 0 \\ 0 & 0 & 1/w_3 & 0 \\ 0 & 0 & 0 & 1/w_4 \end{bmatrix}_{w(4 \times 4)} \cdot [U^T_{(4 \times n)}]$$

After $Q^{-1}$ is obtained, M is solved by multiplying both sides of the equation: $P=M \cdot Q$ by $Q^{-1}$:

$$P = M \cdot Q$$
$$P \cdot Q^{-1} = M \cdot Q \cdot Q^{-1}$$
$$P \cdot Q^{-1} = M \cdot I$$
$$P \cdot Q^{-1} = M$$

M is then used to transform the rescaled scan 403 into a rescaled and transformed scan 403 (step 610). Next, error is measured using sum of squared Mahalanobis distance between the transformed scan 403 and the scan 401 (step 612). In an exemplary embodiment, the sum of Mahalanobis distance between the intensities of corresponding voxels in the two scans is represented by the following equation:

$$\sum_{x,y,z} \left( (I_A[x, y, z] - I_B(G_B[x, y, z]))^t \sum^{-1} (I_A[x, y, z] - I_B(G_B[x, y, z])) \right)$$

where G is a global transformation matrix.

The Mahalanobis distance prevents biasing of a good transformation as a result of small intensity variations due to scanner noise. The Mahalanobis distance effectively classifies intensities before the intensities are compared. This approach is appropriate because two matching locations with the same tissue type may be scanned at slightly different intensities due to scanner differences that should not be considered an unacceptable error. The error that should be measured is an error resulting from an incorrect matching between completely different tissue types. In other embodiments, the sum of squared difference or root mean square error methods may be used instead.

Next, the error is compared to a threshold error and a previous error (step 614). If the error is less than the threshold error and the previous error, the process ends (step 616). If the error is greater than or equal to the threshold error or the previous error, the process repeats at step 606 until the error becomes acceptable. In an exemplary embodiment, the threshold error is predetermined by a user.

In an exemplary embodiment, if the anatomical structure in a scan cannot be segmented, an iterative optimization algorithm described in "Hierarchical model-based motion estimation," Bergen et al, Proceedings of Second European Conference on Computer Vision, Springer-Verlag, p. 237–252, 1992, is used. The transformation parameters (three translation and three rotation) found by Bergen's method are then used to define M, the composite transformation matrix.

Figure 7:
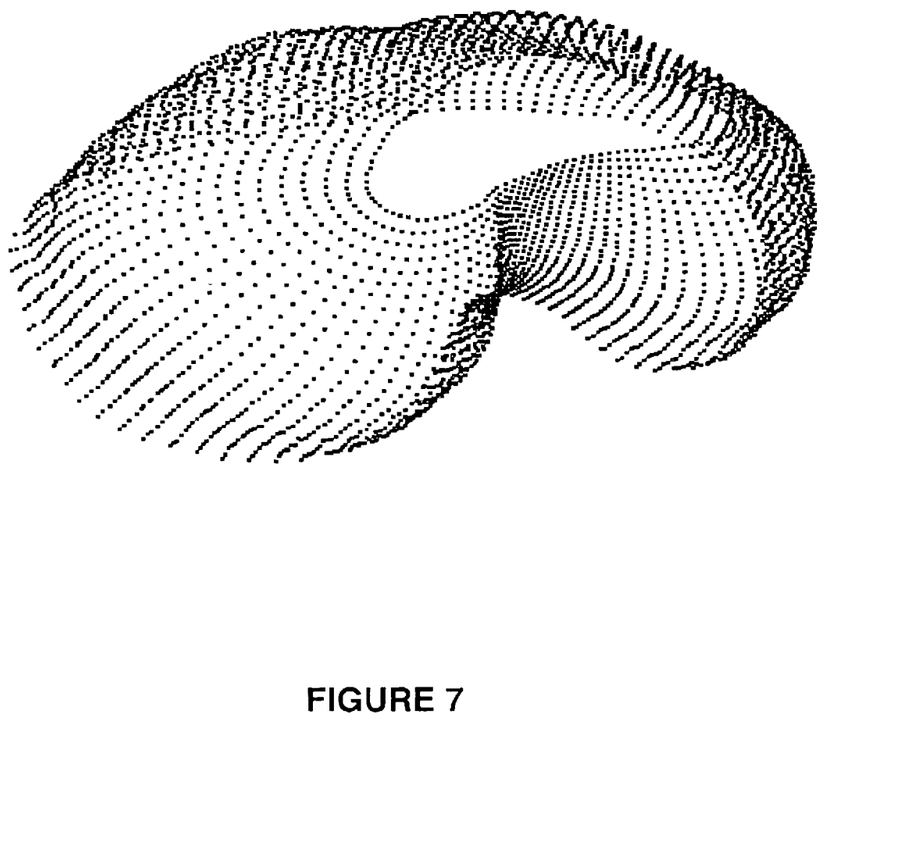
FIG. 7 illustrates an exemplary identifiable points and contours selection in thoracic images in accordance with an embodiment of the invention.

In general, it is important that an appropriate segmentation approach is selected (e.g., step 602 above). Whether a segmentation approach is appropriate depends on the scanning methodology and anatomical structures being scanned. Some scanning methods lend themselves to simple thresholding. For example, computer tomography is a method in which the intensity of a voxel in a scan has a direct physical interpretation relative to the density of the tissue being scanned. In such a case, a computationally intensive segmentation procedure is typically not worthwhile when slightly inferior results can be computed using the smoothing-and-thresholding technique. Similarly, some anatomical structures have more easily identifiable points while others have more easily identifiable contours. For example, in the case of thoracic images, it is relatively simple to segment out the rib cages in the two scans and register the rib cages. But segmenting and registering the rib cages may not offer an accurate registration of the lungs since the lungs move independently inside the ribcage as the patient breathes. In an exemplary embodiment, the topmost points of both apices are selected as the identifiable points and the curves produced by the intersection of the diaphragm and the dorsal costal surfaces are selected as the identifiable contours for thoracic images. FIG. 7 illustrates an exemplary point and contour selection for thoracic images in accordance with an embodiment of the invention.

Figure 8:
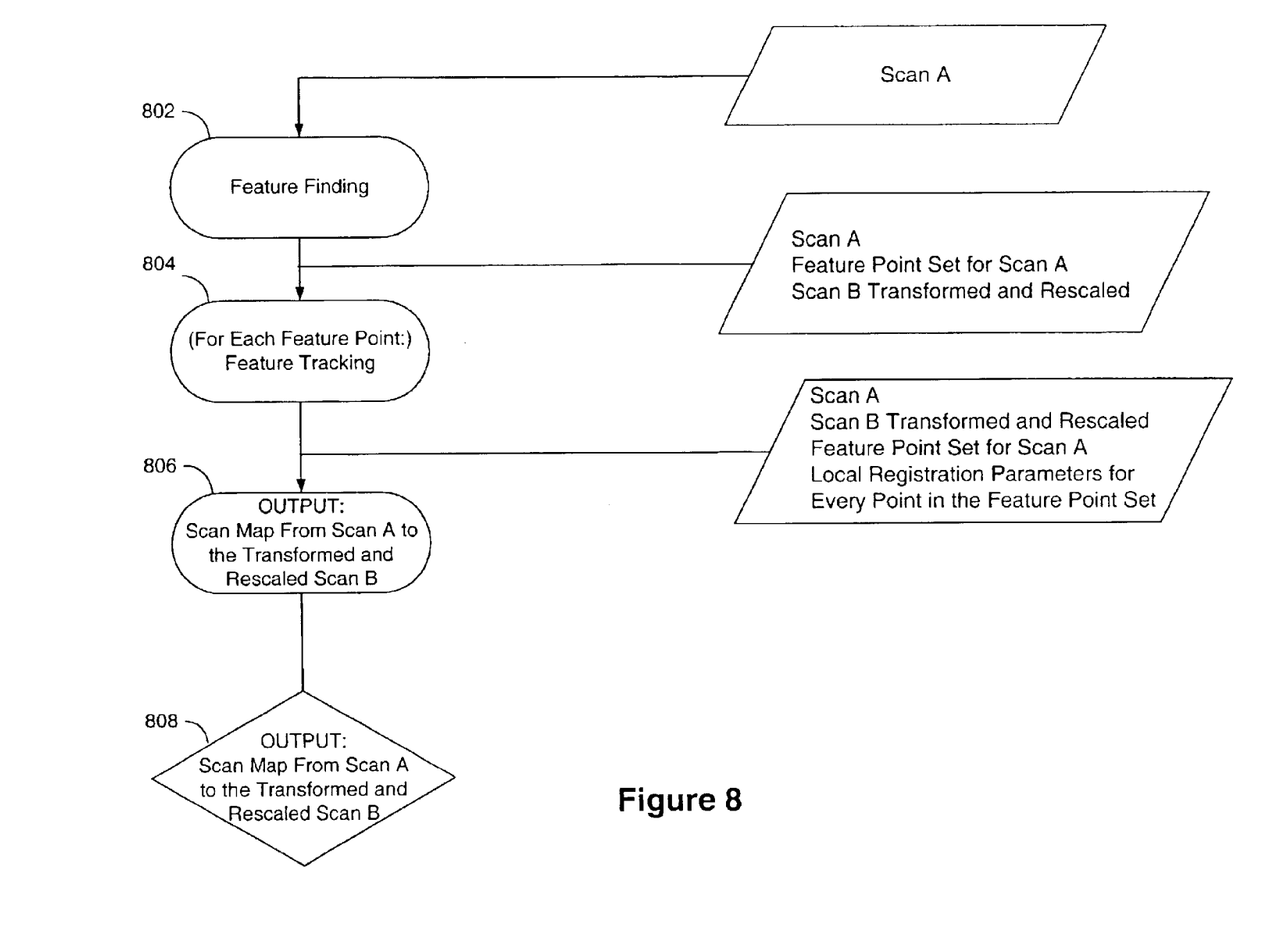
FIG. 8 illustrates an exemplary local similarity transformation process in accordance with an embodiment of the invention.

Due to intrinsic differences in the structures scanned, the global similarity transformation typically cannot achieve the degree of local accuracy desired. To compensate for intrinsic differences, an iterative motion-tracking algorithm for a three-dimensional data set is preferably used to determine transformation parameters for local similarity transformations. In one aspect, employing motion-tracking algorithms has the advantage of not having to assume a rigid body transformation for an anatomical structure being registered such as with the atlas model. FIG. 8 illustrates an exemplary local similarity transformation process in accordance with an embodiment of the invention. At step 802 a feature selection process is performed on the scan 401. The feature selection process ensures concentration on registering highly identifiable points that are likely to correlate to other identifiable features in the scan 403. In a preferred embodiment, local similarity transformations are performed on the selected highly identifiable points (or feature points), not every point in the scan 401. In an exemplary embodiment, the feature points are selected using Shi-Tomasi's method. For more information, please see "An Iterative Image Registration Technique with an Application to Stereo Vision," Bruce D. Lucas and Takeo Kanade, Proceedings of the 7th International Joint Conference on Artificial Intelligence, 1981 [Lucas-Kanade] and "Good features to track," J. Shi and C. Tomasi, Proceedings of the IEEE Conference on Computer Vision and Pattern Recognition, pages 593–600, June 1994 [Shi-Tomasi]. These references are hereby incorporated for all purposes. After the feature points have been selected, for each selected feature point, a feature tracking process is performed (step 804). In an exemplary embodiment, local registration parameters are found using a 3-D iterative factorization technique. In an exemplary embodiment, the iterative factorization technique is as described by Lucas-Kanade for 2-D image registration in a stereo matching application as referenced above except adapted for 3-D images. The Lucas-Kanade technique was also described for finding optical flow fields in motion sequences in "A Paraperspective Factorization Method for Snake and Motion Recovery," Conrad J. Poelman and Takeo Kanade, Technical Report CMU-CS-92-208, Carnegie Mellon University, Pittsburgh, Pa., October 1992. At step 804, features are accepted from two 3-D data sets to perform the feature tracking.

The 3-D iterative factorization technique makes use of an error checking function such as a bilateral gradient similarity function. The bilateral gradient similarity function evaluates the similarity of the intensity isocontour at a feature point as compared to the surrounding intensity isocontour at a registered point. A measure of closeness can be determined by a threshold comparison set, for example, via external visualization testing where an appropriate level of similarity is identified. The similarity measure is based on closeness in both magnitude and direction of the isocontour. High-magnitude isocontour vectors in the first scan (scan 401) (i.e., corresponding to high intensity variation at that point in the image) are determined to be similar to those in the neighborhood of the matching point in the second scan (scan 403) when the points are similar in both magnitude and direction. This technique uses the direction of anatomical landmarks (e.g., vessels) to designate the "correctness" of the transformation. One advantage of using this technique, which relies on the intensity constancy assumption, is that intensity values generally have a designated meaning (e.g., tissue types) in medical imaging techniques (e.g., CT scanning). Additionally, the technique allows non-rigid transformations, which is a desired effect for local registration because the technique does not assume a single motion in the image.

Next, for every point in the scan 401 that is not a "feature point", a transformation weighting is performed (step 806). This step allows the registration of items and objects that did not appear, or have vanished, to be registered with their context or environment as the items or objects would have been located. For every point that is not a feature point, in one approach a linear combination of local transformations for the feature points in its local neighborhood is performed. The weighting of the local transformations is relative to the feature points' distance to the point being registered. In one embodiment, the size of the neighborhood is predetermined by a user. For example, a neighborhood could be 50×50×50 pixels. In another embodiment, a default size of the neighborhood is hard-coded into memory. In the former embodiment, the size is usually determined empirically and is unique to the type of scan and the anatomical structure being scanned. The output of the transformation weighting is a scan map from the scan 401 to the transformed and rescaled scan 403, which was obtained as a result of the global similarity transformation process as described in FIG. 5 above (step 808).

It is noted that while the algorithm described herein is discussed in regards to 3-D images, the algorithm is simplified and adapted for 2-D images. For 2-D images, the Lucas-Kanade technique need not be extended and can be used generally as-is.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for registering images, comprising the steps of:
   receiving a first image and a second image, said first image and said second image including data sets of at least two dimensions;
   globally transforming one of said images via a rigid transformation technique;
   locally transforming one of said images via an iterative motion tracking technique; and
   outputting a registered image;
   wherein said globally transforming includes the steps of:
   constructing a first pyramid for said first image;
   constructing a second pyramid for said second image;
   determining a set of optimal scale factors;
   performing a uniform scaling on said second image in accordance with said set of optimal scale factors to obtain a rescaled second image;
   determining a set of optimal translation and rotation parameters; and
   performing a transformation on said rescaled second image based on said set of optimal translation and rotation parameters.

2. The method of claim 1, further comprising the step of:
   reconstructing said second pyramid after said uniform scaling step.

3. The method of claim 1, wherein said determining a set of optimal scale factors includes the steps of:
   determining a first voxel size in said first image;
   determining a second voxel size in said second image; and
   constructing a scaling matrix based on said first voxel size and said second voxel size.

4. The method of claim 1, wherein said determining a set of optimal scale factors includes the steps of:
   segmenting a first anatomical structure in said first image;
   segmenting a second anatomical structure in said second image;
   determining a first largest span in said first anatomical structure;
   determining a second largest span in said second anatomical structure; and
   constructing a scaling matrix based on said first largest span and said second largest span.

5. The method of claim 1, wherein said determining a set of optimal translation and rotation parameters includes the steps of:
   segmenting a first anatomical structure in said first image to obtain a first map;
   segmenting a second anatomical structure in said second image to obtain a second map;
   identifying a first set of identifiable points or contours in said first map and a second set of identifiable points or contours in said second map;
   constructing a transformation matrix based on said first set of identifiable points or contours and said second set of identifiable points or contours; and
   transforming said second image in accordance with said transformation matrix to obtain a transformed second image.

6. The method of claim 5, further comprising the step of:
   subsampling said first image and said second image based on said first map and said second map.

7. The method of claim 5, further comprising the steps of:
   measuring an error between said transformed second image and said first image;
   comparing said error to a threshold error; and
   repeating said identifying step if said error is greater than said threshold error.

8. The method of claim 5, further comprising the steps of:
   measuring an error between said transformed second image and said first image;
   comparing said error to a previous error; and
   repeating said identifying step if said error is greater than said previous error.

9. The method of claim 1, wherein said locally transforming includes the steps of:
   selecting a set of feature points in at least one of said images;
   performing a feature tracking process on each of said set of feature points; and
   performing a transformation weighting process on each point in at least one of said images that is not a feature point.

10. A method for registering images, comprising the steps of:
    receiving a first image and a second image, said first image and said second image including data sets of at least two dimensions;
    globally transforming one of said images via a rigid transformation technique;
    locally transforming one of said images via an iterative motion tracking technique; and
    outputting a registered image;
    wherein said locally transforming includes the steps of:
    selecting a set of feature points in at least one of said images;
    performing a feature tracking process on each of said set of feature points; and
    performing a transformation weighting process on each point in at least one of said images that is not a feature point.

11. The method of claim 10 wherein said globally transforming includes the steps of:
    determining a set of optimal scale factors;
    performing a uniform scaling on one of said images in accordance with said set of optimal scale factors to obtain a rescaled image;
    determining a set of optimal translation and rotation parameters; and
    performing a transformation on said rescaled image based on said set of optimal translation and rotation parameters.

12. The method of claim 11, wherein said determining a set of optimal scale factors includes the steps of:
    determining a first voxel size in said first image;
    determining a second voxel size in said second image; and
    constructing a scaling matrix based on said first voxel size and said second voxel size.

13. The method of claim 11, wherein said determining a set of optimal scale factors includes the steps of:
    segmenting a first anatomical structure in said first image;
    segmenting a second anatomical structure in said second image;
    determining a first largest span in said first anatomical structure;

determining a second largest span in said second anatomical structure; and constructing a scaling matrix based on said first largest span and said second largest span.

14. The method of claim 11, wherein said determining a set of optimal translation and rotation parameters includes the steps of:

segmenting a first anatomical structure in said first image to obtain a first map;

segmenting a second anatomical structure in said second image to obtain a second map;

identifying a first set of identifiable points or contours in said first map and a second set of identifiable points or contours in said second map;

constructing a transformation matrix based on said first set of identifiable points or contours and said second set of identifiable points or contours; and transforming said second image in accordance with said transformation matrix to obtain a transformed second image.

15. A computer program product embodied in a computer readable medium for registering multiple images, comprising:

logic code for receiving a first image and a second image, said first image and said second image including data sets of at least two dimensions;

logic code for globally transforming at least one of said images via a rigid transformation technique;

logic code for locally transforming at least one of said images via an iterative motion tracking technique; and logic code for outputting a registered image;

wherein said logic code for globally transforming includes:

logic code for constructing a first pyramid for said first image;

logic code for constructing a second pyramid for said second image;

logic code for determining a set of optimal scale factors based on said first pyramid and said second pyramid;

logic code for performing a uniform scaling on said second image in accordance with said set of optimal scale factors to obtain a rescaled second image;

logic code for determining a set of optimal translation and rotation parameters; and logic code for performing a transformation on said rescaled second image based on said set of optimal translation and rotation parameters.

16. The computer program product of claim 15, further comprising logic code for reconstructing said second pyramid after said uniform scaling.

17. The computer program product of claim 12, wherein said logic code for determining a set of optimal scale factors includes:

logic code for determining a first voxel size in said first image;

logic code for determining a second voxel size in said second image; and logic code for constructing a scaling matrix based on said first voxel size and said second voxel size.

18. The computer program product of claim 15, wherein said logic code for determining a set of optimal scale factors includes:

logic code for segmenting a first anatomical structure in said first image;

logic code for segmenting a second anatomical structure in said second image;

logic code for determining a first largest span in said first anatomical structure;

logic code for determining a second largest span in said second anatomical structure; and logic code for constructing a scaling matrix based on said first largest span and said second largest span.

19. The computer program product of claim 15, wherein said logic code for determining a set of optimal translation and rotation parameters includes:

logic code for segmenting a first anatomical structure in said first image to obtain a first map;

logic code for segmenting a second anatomical structure in said second image to obtain a second map;

logic code for identifying a first set of identifiable points or contours in said first map and a second set of identifiable points or contours in said second map;

logic code for constructing a transformation matrix based on said first set of identifiable points or contours and said second set of identifiable points or contours; and logic code for transforming said second image in accordance with said transformation matrix to obtain a transformed second image.

20. The computer program product of claim 19, further comprising:

logic code for subsampling said first image and said second image based on said first map and said second map.

21. The computer program product of claim 19, further comprising:

logic code for measuring an error between said transformed second image and said first image;

logic code for comparing said error to a threshold error; and logic code for repeating said identifying step if said error is greater than said threshold error.

22. The computer program product of claim 19, further comprising:

logic code for measuring an error between said transformed second image and said first image;

logic code for comparing said error to a previous error; and logic code for repeating said identifying step if said error is greater than said previous error.

23. The computer program product of claim 15, wherein said logic code for locally transforming at least one of said images includes:

logic code for selecting a set of feature points in at least one of said images;

logic code for performing a feature tracking process on each of said set of feature points; and logic code for performing a transformation weighting process on each point in at least one of said images that is not a feature point.

24. A computer program product embodied in a computer readable medium for registering multiple images, comprising:

logic code for receiving a first image and a second image, said first image and said second image including data sets of at least two dimensions;

logic code for globally transforming at least one of said images via a rigid transformation technique;

logic code for locally transforming at least one of said images via an iterative motion tracking technique;

logic code for outputting a registered image;

wherein said logic code for locally transforming at least one of said images includes:

logic code for selecting a set of feature points in at least one of said images;

logic code for performing a feature tracking process on each of said set of feature points; and logic code for performing a transformation weighting process on each point in at least one of said images that is not a feature point.

25. The computer program product of claim 24 wherein said logic code for globally transforming includes:

logic code for determining a set of optimal scale factors;

logic code for performing a uniform scaling on one of said images in accordance with said set of optimal scale factors to obtain a rescaled image;

logic code for determining a set of optimal translation and rotation parameters; and logic code for performing a transformation on said rescaled image based on said set of optimal translation and rotation parameters.

26. The computer program product of claim 25, wherein said logic code for determining a set of optimal scale factors includes:

logic code for determining a first voxel size in said first image;

logic code for determining a second voxel size in said second image; and logic code for constructing a scaling matrix based on said first voxel size and said second voxel size.

27. The computer program product of claim 25, wherein said logic code for determining a set of optimal scale factors includes:

logic code for segmenting a first anatomical structure in said first image;

logic code for segmenting a second anatomical structure in said second image;

logic code for determining a first largest span in said first anatomical structure;

logic code for determining a second largest span in said second anatomical structure; and logic code for constructing a scaling matrix based on said first largest span and said second largest span.

28. The computer program product of claim 25, wherein said logic code for determining a set of optimal translation and rotation parameters includes:

logic code for segmenting a first anatomical structure in said first image to obtain a first map;

logic code for segmenting a second anatomical structure in said second image to obtain a second map;

logic code for identifying a first set of identifiable points or contours in said first map and a second set of identifiable points or contours in said second map;

logic code for constructing a transformation matrix based on said first set of identifiable points or contours and said second set of identifiable points or contours; and logic code for transforming said second image in accordance with said transformation matrix to obtain a transformed second image.

* * * * *